358-86. XR 3,086,091 SR CROSS REFERENCE SEARCH ROOM

April 16, 1963 J. D. REID 3,086,091

SHIELDED SWITCH DEVICE

Filed May 5, 1959 4 Sheets-Sheet 1

Tx500

INVENTOR.
JOHN D. REID
BY Darby & Darby
ATTORNEYS

April 16, 1963 J. D. REID 3,086,091
SHIELDED SWITCH DEVICE
Filed May 5, 1959 4 Sheets-Sheet 2

| POSITION | CONNECTION |
|---|---|
| 1 | OFF |
| 2 | LINE 12 |
| 3 | LINE 13 |
| 4 | EXTERNAL |
| 5 | LINE 10 |
| 6 | LINE 11 |

INVENTOR.
JOHN D. REID
BY
Darby & Darby
ATTORNEYS

April 16, 1963 J. D. REID 3,086,091

SHIELDED SWITCH DEVICE

Filed May 5, 1959 4 Sheets-Sheet 3

INVENTOR.
JOHN D. REID
BY Darby & Darby
ATTORNEYS

SHIELDED SWITCH DEVICE

| POSITION | CONNECTION |
|---|---|
| 1 | OFF |
| 2 | LINE 10' |
| 3 | LINE 11' |

INVENTOR.
JOHN D. REID
BY Darby & Darby
ATTORNEYS

United States Patent Office 3,086,091

Patented Apr. 16, 1963

3,086,091
SHIELDED SWITCH DEVICE

John D. Reid, Little Rock, Ark., assignor to A R & T Electronics, Inc., North Little Rock, Ark., a corporation of Arkansas Filed May 5, 1959, Ser. No. 811,195
2 Claims. (Cl. 200—11)

This invention relates to switch devices and more particularly to a line selector switch for use in closed-circuit distribution systems for televesion signals and the like.

In my copending patent application, Serial No. 712,229, filed January 30, 1958, there is described a closed-circuit distribution systems for television signals and the like. wherein a number of different programs are transmitted from a central station to a plurality of subscriber locations by means of transmission lines. A single line is utilized to carry a single program, so that if N programs are to be transmitted to each subscriber location there would be N lines employed for the transmission. By tuning the television receiver at each subscriber location to an unused channel, the signals from the transmission lines may be supplied to the receiver. When the transmitted program signals have a different "center" or carrier frequency than the center frequency of the unused channel to which the receiver is tuned, a frequency converter is employed at the subscriber's receiving set to make the necessary frequency conversion of the received signals. In order to simplify the equipment required at the subscriber locations and reduce interference from local sources the program signals transmitted over the different transmission lines are arranged to have the same center frequency, so that only a single frequency converter need be employed at each subscriber location. Therefore, a selector switch should be employed at each of the subscriber locations to connect one of the transmission lines to the input line of the frequency converter, so that the subscriber may select the particular program which he wishes to receive.

Inasmuch as the program signals are transmitted at high frequencies, it is important that adequate shielding be provided to prevent unwanted "cross-talk" and interference which might impair reception of the wanted program. By utilizing coaxial cables for the transmission lines, satisfactory shielding of the program signals may be obtained prior to their introduction at the subscriber location. However, shielding problems arise in the selector switch where the different program signals are to be applied to the input of the frequency converter. One solution of these problems involves the employment of a coaxial type switch as the line selector switch. However, these switches are relatively expensive and add materially to the cost of the converter unit at the subscriber locations. Furthermore, the transmission lines which are not connected to the input line of the frequency converter must be terminated in order to avoid reflections and other disturbances. It is therefore desirable that the unused and unconnected transmission lines be terminated with a suitable terminating impedance by the action of the selector switch.

Accordingly, it is an object of this invention to provide a shielded switch device which offers protection comparable to coaxial type switches, but which is simpler and less expensive to manufacture.

It is a further object of this invention to provide a shielded switch device which is operable to selectively connect a plurality of transmission lines to an input line and which automatically terminates the unconnected transmission lines with their characteristic impedances.

It is a still further object of this invention to provide a line selector switch for a closed-circuit distribution system for radio or television signals and the like.

Briefly, the shielded switch device of the invention comprises a plurality of active contacts which are adapted to be connected to a plurality of electric circuit means, such as the transmission lines and input line in a closed-circuit distribution system, for example, a plurality of shield contacts connected to electrical ground are interspersed with the active contacts, so that the active contacts are separated from each other by at least one shield contact. Active switch arm means are provided for interconnecting predetermined ones of the active contacts in each of the switch positions, to thereby perform the actual switching operation. The invention also provides for the use of shield switch arm means located adjacent the active switch arm means and arranged to be in contact with at least one of the shield contacts in each of the switch positions. When the switch positions are spaced a predetermined distance apart, so that the "throw" of the switch is the same for all positions, the active switch arm means need only extend a distance equal to the throw of the switch. Finally, means are provided for causing relative movement between the switch arm means and the contacts to place the switch in each of its positions and thereby make the predetermined connections. Since the shield switch arm means remains at ground potential for each switch position, the shield contacts combine with the shield switch arm means to effectively shield the active switch contacts in each switch position, in the manner of a coaxial type switch. Furthermore, the "unused" active contacts, those that are not connected by the active switch arm means in a particular switch position, are shielded from the active switch arm means by the shield switch arm means. When the shielded switch device of the invention is employed as the line selector switch in a closed-circuit distribution system, additional means are provided for suitably terminating the "unused" transmission lines in each switch position.

Figure 1:
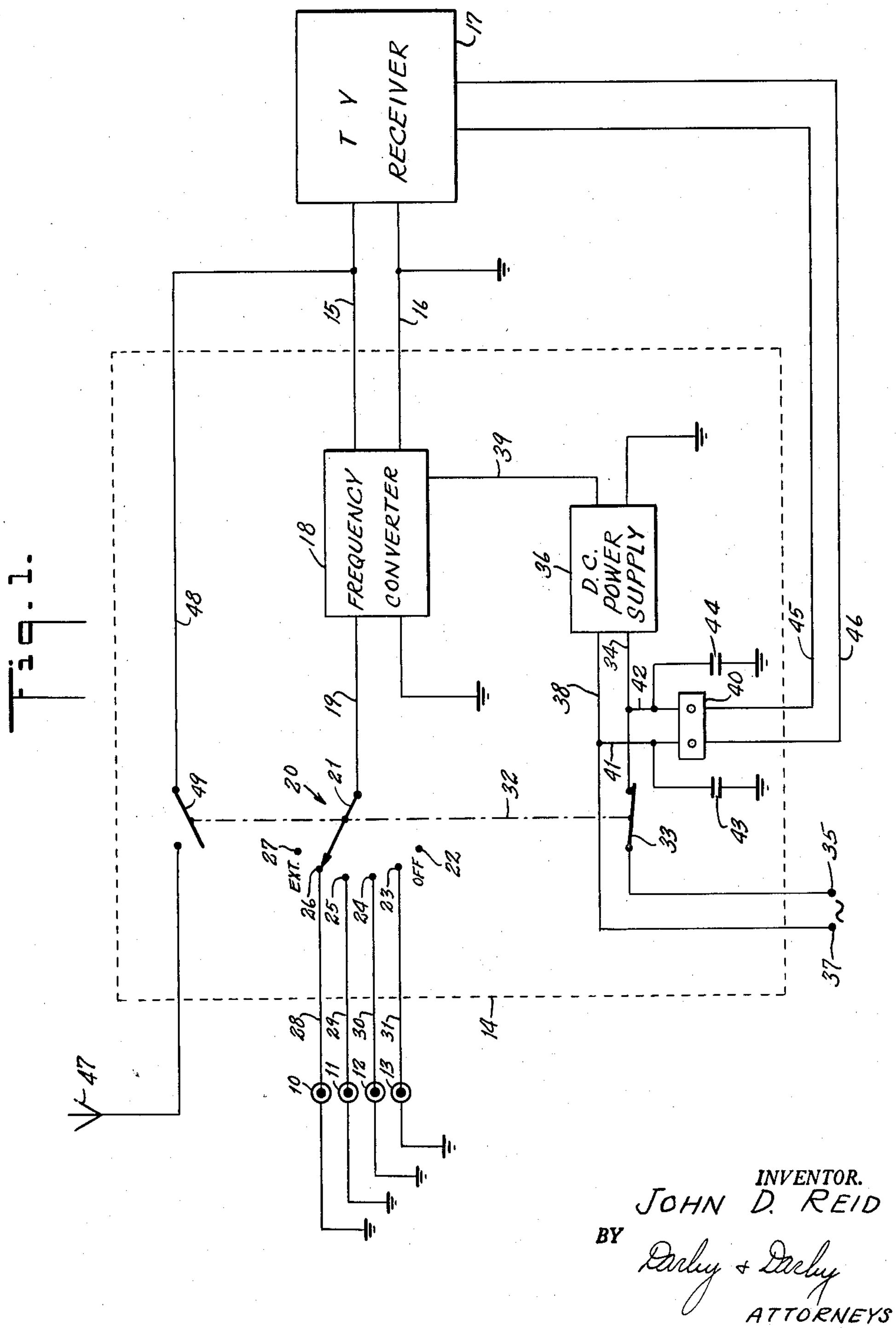
FIG. 1 is a schematic circuit diagram of a portion of a closed-circuit distribution system for television signals.

Referring now to FIG. 1 of the drawings, there is shown the apparatus located at each of the subscriber's locations in a closed-circuit distribution system for television signals of the type disclosed in my aforementioned patent application. As seen in FIG. 1, the program signals are transmitted over coaxial cables 10, 11, 12 and 13 to converter apparatus 14 located at the subscriber's home or office. Each of the cables 10–13 carries a different program but on the same carrier frequency. The converter 14 functions to convert the carrier frequency of the received program signals to the center frequency of an unused channel on the subscriber's television receiver, so that the output from the converter may be connected directly by leads 15 and 16 to the normal input terminals of the subscriber's receiver 17. The converter 14 includes a frequency converter 18 which performs the actual frequency conversion operation and which is connected by an input line 19 to a line selector switch 20. As illustrated schematically, the selector switch 20 comprises a movable switch arm 21 and a plurality of fixed contacts 22–27. A lead 28 is arranged to connect coaxial cable 10 to fixed switch contact 26, while a lead 29 serves to connect cable 11 to fixed contact 25. Similarly, a lead 30 connects coaxial cable 12 to switch contact 24 and a lead 31 connects cable 13 to switch contact 23. By this means, each of the coaxial cables is connected to a different one of the fixed switch contacts, so that the switch arm 21 is adapted to connect the input line 19 of frequency converter 18 to a selected cable.

The movable switch arm 21 of the selector switch is also arranged to mechanically actuate a power switch 33 as shown schematically by the dashed line 32. Switch 33 is connected by a lead 34 to one terminal 35 of a source (not shown) of A.C. supply power and to the input of a D.C. supply 36. The input of D.C. power supply 36 is also connected to the other terminal 37 of the A.C. supply source by means of lead 38. A lead 39 serves to connect the output of power supply 36 to the frequency converter 18. As explained in my aforementioned patent application, the D.C. power supply 36 functions to supply the filament and plate supply voltages for the tube elements of frequency converter 18. A conventional A.C. power receptacle 40 is connected by leads 41 and 42 to the A.C. supply lines 38, 34 feeding the D.C. power supply. Capacitors 43 and 44 are connected between ground and the input leads 41, 42 to receptacle 40 to provide a low impedance path to ground for induced RF voltages. Finally, the power supply leads 45, 46 of the television receiver 17 are connected to the A.C. receptacle 40, so that the receiver may be energized through the converter 14. By suitably arranging the mechanical connection 32 between movable switch arm 21 of the selector switch and the power switch 33, the receiver 17 may be energized only when the selector switch is in a position other than its "off" position 22. Therefore, a single control may be utilized by the subscriber to both energize the television receiver and to select a particular program for viewing. The converter 14 also provides means for connecting the subscriber's external antenna 47 to the input of the television receiver in the event that the subscriber wishes to receive a non-subscription program. As seen in FIG. 1, the antenna 47 is connected by a lead 48 and a switch 49 to the input lead 15 of the receiver 17. Switch 49 is mechanically linked, as indicated schematically by the dashed line 32, to the switch arm 21 of the selector switch. By arranging the mechanical connection so that switch 49 is only closed when the switch arm 21 is placed in "external" position 27, the line selector switch may also perform the function of connecting the external antenna to the television receiver. It may be noted that power switch 33 remains closed in this position, so that receiver 17 is energized.

Figure 2:
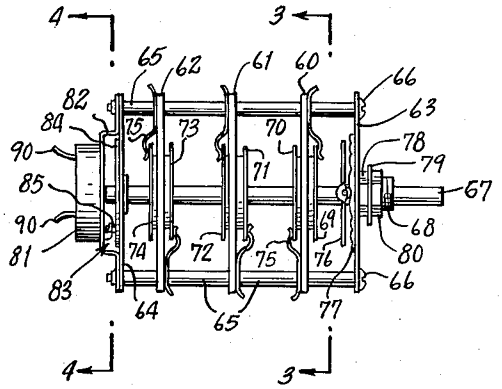
FIG. 2 is a plan view of a line selector switch constructed in accordance with the teachings of the invention.
Figure 3:
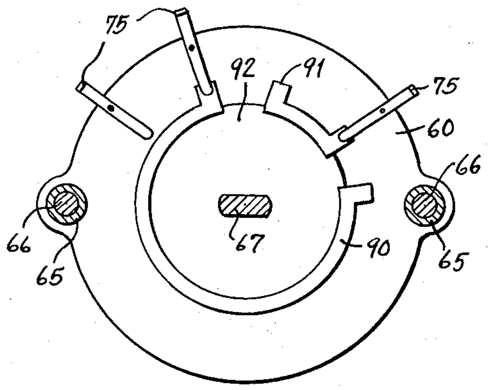
FIG. 3 is a sectional view taken along the lines 3—3 of FIG. 2.

FIG. 2 of the drawings illustrates the physical arrangement of a switch device which may be utilized as the line selector switch 20 in the system of FIG. 1. As seen in FIG. 2, the device comprises sections 60, 61 and 62 which are supported by end plates 63 and 64 and spacers 65. The spacers 65 may be short sections of tubing which are held in place between the switch sections by long threaded rods or screws 66 which are threaded into end plate 64. A shaft 67 is rotatably supported in externally threaded bearing member 68 and is arranged to both support and rotate the movable switch arm portions of the switch. In this illustrated embodiment of the invention, a movable portion 69 is provided for the front side of section 60 while a movable portion 70 is provided for the rear side of that section. Similarly, a movable portion 71 is provided for the front side of section 61, while movable portion 72 is arranged on the rear side of the section. Finally, a movable portion 73 is arranged on the front side of section 62 while a movable portion 74 is located on the rear side of that section. As seen in FIG. 3 of the drawings, each movable portion comprises one or more switch arms 90, 91, which are mounted on a disk 92 of insulating material. The arms 90, 91 are formed of electrically conductive material and are arranged to contact predetermined ones of fixed contacts 75 in the various switch positions. By arranging a plurality of fixed contacts 75 on one or both sides of the sections 60–62 of the switch adjacent the movable switch arm portions 69—74, it is possible to perform a plurality of switching functions by a single rotary motion of the shaft 67. In order to facilitate the accurate placement of shaft 67 in a plurality of predetermined switch positions, a detent mechanism comprising elements 76 and 77 is provided. Element 76 of the detent mechanism is a circular plate which is secured to the shaft 67 for rotation therewith, while element 77 is a serrated annular member which is secured to the end plate 63. As the shaft 67 rotates, an outwardly extending detent portion formed on element 76 rides in and out of the serrations on element 77, so that if the shaft 67 is stopped in a position between two switch positions, the detent portion will seat itself in the apex of the nearest serration, to thereby accurately position the switch. In order to mount the switch on the face plate of the converter equipment, nut 78, washer 79, and nut 80 are provided on the externally threaded bearing member 68.

Figure 4:
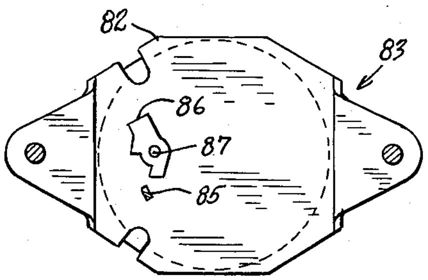
FIG. 4 is a sectional view taken along the lines 4—4 of FIG. 2.

A two-position "on-off" switch 81 which may be the power switch 33 of FIG. 1 of the drawings, is secured to the end plate 64 by a support member 82 and the screws 66. The switch 81 has terminals 90 and is actuated by the shaft 67 through a device, indicated generally as 83, which opens the switch only in one position of the selector switch. As seen in FIGS. 2 and 4, the device includes a circular plate 84 which is mounted on the drive shaft 67 of the selector switch. The plate 84 has a small pin 85 mounted thereon which is movable along with the plate by the rotation of shaft 67. The pin 85 is arranged to strike a lever arm 86 of the switch 81 when the shaft 67 is rotated in either a clockwise or a counter-clockwise direction. The lever arm 86 is pivoted at 87, so that when pin 85 strikes the inwardly extending portion of the arm, the switch 81 is closed or opened, depending upon the direction of rotation of shaft 67. By virtue of this arrangement, the switch 81 is left in an "on" position for all positions except one of the line selector switch.

Figure 5:
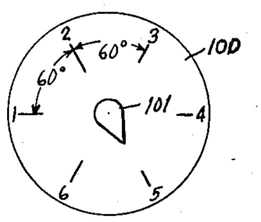
FIG. 5 is a front view of a suitable indicator dial for the line selector switch of the invention showing the connections made in each switch position.

FIG. 5 of the drawings shows the indicator dial arrangement for the line selector switch of the invention and indicates the connections made by the switch in each of its six positions. As seen in FIG. 5, the indicator dial arrangement comprises a calibrated dial plate 100 and an indicator knob 101. The dial plate 100 is calibrated in six equally-spaced positions, so that there is a 60° "throw" of the switch between succeeding positions. The table in FIG. 5 shows the connections made by the switch in each of its numbered positions. Therefore, in position 1, the selector switch is in an "off" position, so that the power supply switch 81 is also in an "off" position. In position 2, the power supply switch 81 is turned on and the line selector switch connects transmission line 12 to the input line of frequency converter 18. Position 3 of the switch connects transmission line 13 to the input of the frequency converter and similarly maintains the power switch in an "on" position. In position 4, the television receiver 17 is connected to its external antenna 47, while positions 5 and 6 respectively connect transmission lines 10 and 11 to the input of frequency converter 18. It is believed that the operation of the novel line selector switch of the invention may best be understood by reference to FIG. 6 of the drawings, which shows the detailed circuit diagram of the switch and the arrangement of its movable switch arms and contacts.

Figure 6:
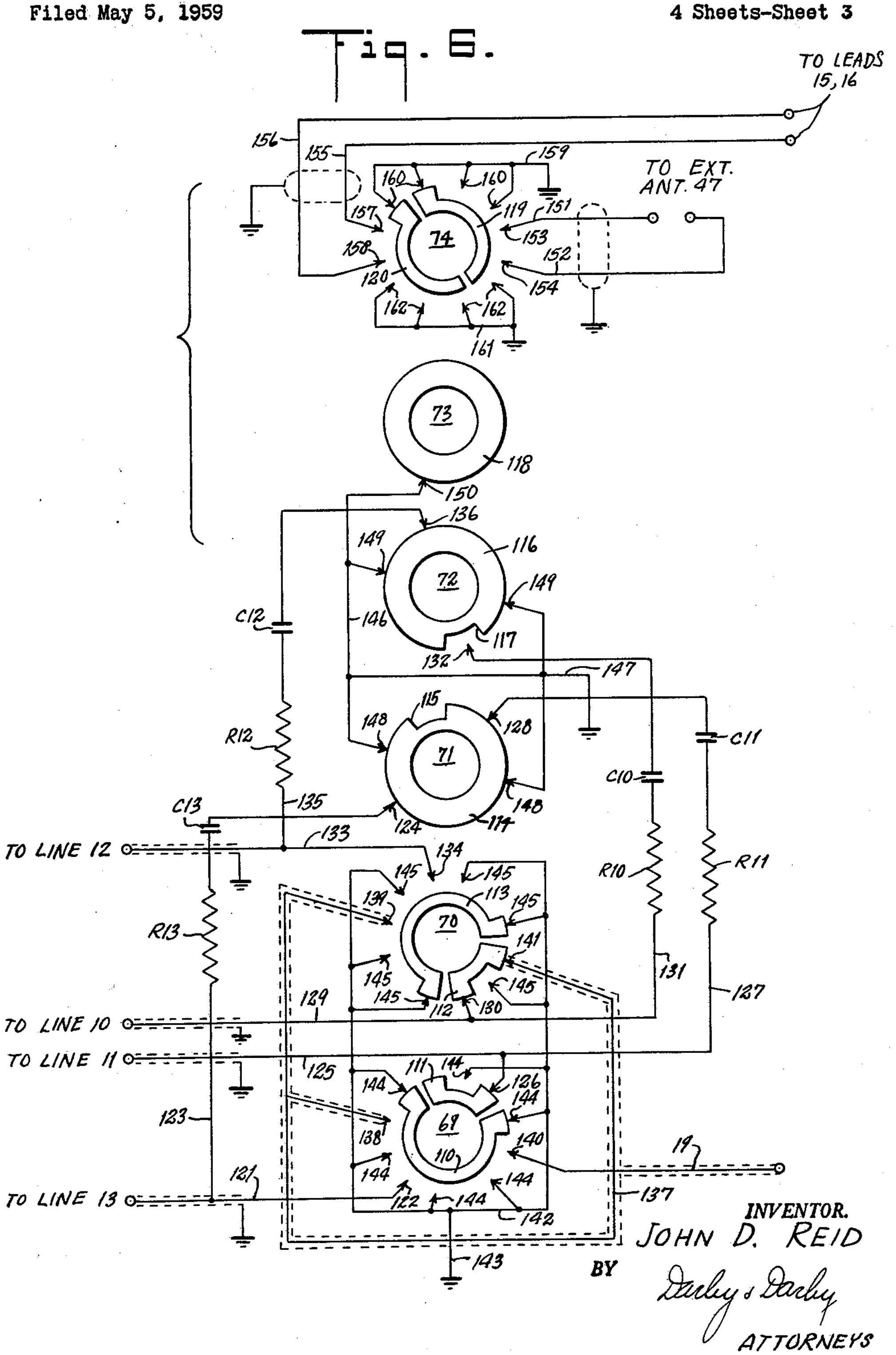
FIG. 6 is a circuit diagram of the line selector switch of FIG. 2.

As seen in FIG. 6, movable switch portion 69 which is mounted on the front side of section 60 of the selector switch comprises a shield switch arm 110 and an active switch arm 111 which are circularly arranged. Active switch arm 111 performs the actual switching operation and extends over an angular distance of 60°, which it may be noted is equal to the switch throw between adjacent switch positions. The movable switch portion 70 which is mounted on the rear side of section 60 also comprises an active switch arm 112 and a shield switch arm 113. Again, the active arm 112 extends over an arc of 60° and performs the actual switching operation. Movable switch portion 71 which is located on the front side of section 61 of the switch includes a single switch arm 114 having a notched portion 115 formed therein. Similarly, movable switch portion 72 which is mounted on the rear side of section 61 comprises a single switch arm 116 having a notched portion 117. Movable switch portions 73 and 74 are respectively mounted on the front side and rear side of section 62 of the switch. Portion 73 comprises a single circular switch arm 118 while portion 74 comprises two semi-circular switch arms 119 and 120. From the foregoing description of FIG. 2 of the drawings, it will be understood that all of the movable switch portions 69—74 move together when the shaft 67 of the selector switch is rotated from one position to another. Therefore, by suitably arranging the fixed contacts 75 of the switch, it is possible to perform a plurality of switching functions with a single movement or "throw" of the switch. The detailed arrangement of fixed contacts 75 will now be described.

The transmission line 13 is connected by a lead 121 to a fixed contact 122 adjacent movable portion 69 of the switch. The line 13 is also connected by a lead 123, a resistor R13, capacitor C13 to a fixed contact 124 adjacent the movable portion 71 of the switch. The elements R13 and C13 form the terminating impedance for the transmission line 13. Transmission line 11 is connected by a lead 125 to a fixed contact 126 adjacent movable portion 69 of the switch and is connected by a lead 127, a resistor R11 and a capacitor C11 to a fixed contact 128 adjacent the movable portion 71 of the switch. Transmission line 10 is connected by a lead 129 to a fixed contact 130 adjacent movable portion 70 of the switch and by a lead 131, a resistor R10 and a capacitor C10 to a fixed contact 132 adjacent the movable portion 72 of the switch. Finally, transmission line 12 is connected by a lead 133 to a fixed contact 134 adjacent movable switch portion 70 and by a lead 135, a resistor R12 and a capacitor C12 to a fixed contact 136 adjacent movable switch portion 72. Again, the resistor and capacitor associated with each of the lines 10, 11 and 12 constitute the terminating impedance for that transmission line. It may be noted at this point that each transmission line is connected to a fixed contact on either movable portion 69 or movable portion 70 of the switch with a direct connection and to a fixed contact on either movable portion 71 or movable portion 72 of the switch through a terminating impedance. The input line 19 of the frequency converter 18 of FIG. 1 of the drawings is connected by a lead 137 to a contact 138 adjacent movable switch portion 69 and to a contact 139 adjacent movable switch portion 70. Additionally, the lead 137 connects lead 19 to a contact 140 adjacent movable switch portion 69 and a contact 141 adjacent movable switch portion 70. Finally, a lead 142 which is electrically grounded at 143 is connected to a plurality of shield contacts 144 adjacent movable switch portion 69 and to a plurality of shield contacts 145 adjacent movable switch portion 70. It may be noted that the grounded shield contacts 144 are interspersed with the "active" contacts of movable switch portion 69, so that there is at least one grounded shield contact between each of the active contacts of that portion. For example, there are shield contacts 144 located on both sides of active contact 126 which is connected to the transmission line 11. Similarly, there are shield contacts 144 on both sides of active contact 122 which is connected to transmission line 13. Furthermore, active contacts 138 and 140 which are connected to the input line 19 of the frequency converter each have a grounded shield contact on both sides. Again, in a similar manner, the grounded shield contacts 145 associated with the movable switch portion 70 are arranged on both sides of the active contacts 130, 134, 139 and 141 which are associated with the transmission lines 10 and 12 and the input line 19 of the frequency converter. By virtue of this arrangement, any active contact which would be carrying current in any switch position is shielded on both sides by a grounded shield contact.

With respect to movable switch portions 71, 72 and 73, it may be seen that a lead 146, which is electrically grounded at 147 is connected to a pair of contacts 148 adjacent movable switch portion 71 and a pair of contacts 149 adjacent movable switch portion 72. The same lead 146 is also connected to a single contact 150 adjacent movable switch portion 73. Because of this arrangement, each of the active contacts 124, 128, adjacent movable switch portion 71 is grounded except when the notched portion 115 of the switch arm 114 is adjacent that contact. Similarly, each of the active contacts 132, 136 adjacent switch portions 72 is grounded except when the notched portion 117 of switch arm 116 is adjacent that contact. This effectively permits the unused or unselected transmission lines to be terminated with their associated terminating impedances. Again it may be noted that the active contacts 124 and 128 of switch portion 71 are shielded by grounded contacts 148, while active contacts 132 and 136 of switch portion 72 are shielded by grounded contacts 149. The switch arm 118 of movable switch portion 73 is connected to ground at all times by contact 150 and serves to shield the portions 69, 70, 71 and 72 of the selector switch which handle transmission lines 10—13 from the portion 74 which handles the external antenna 47 of the television receiver of FIG. 1. The antenna 47 of FIG. 1 is connected by leads 151 and 152 to contacts 153 and 154 which are located adjacent the movable switch portion 74. Leads 155 and 156 are respectively connected to contacts 157 and 158 adjacent the movable portion 74 and are connected to leads 15 and 16 which connect the output of frequency converter 18 to the input of the television receiver 17 of FIG. 1. A lead 159 serves to connect four shield contacts 160 to ground, while a lead 161 performs a similar function with respect to four oppositely located shield contacts 162. Again, the active contacts 153, 154, 157 and 158 are separated from each other by the grounded shield contacts 160 and 162.

The line selector switch shown in FIG. 6 of the drawings is in position 5 and therefore connects transmission line 10 to the input line 19 of frequency converter 18, so that the subscriber may view the program transmitted thereover. In this position, the active switch arm 112 of the movable portion 70 of the switch connects active contact 130 to active contact 141 and thereby makes the actual physical connection between transmission line 10 and lead 19. At the same time, the notched portion 117 of switch arm 116 in movable portion 72 of the switch is adjacent contact 132 which is connected to the terminating impedance R10, C10 for the transmission line 10, so that the terminating impedance for this line is not connected to ground through the switch arm 116. It will be observed however that contacts 128, 136 and 124 which are connected to the terminating impedances for lines 11, 12 and 13 are connected to ground through the switch arms 114 and 116, so that these lines are terminated by their respective terminating impedances. Furthermore, the switch arms 119 and 120 of the movable switch portion 74 are connected to the grounded shield contacts 160, so that the external antenna 47 is not connected to the input of television receiver 17. Therefore, the television receiver receives only the program signals from transmission line 10. Inasmuch as positions 2, 3 and 6 of the selector switch are similar to switch position 5 in that a single transmission line is connected to the input line of the frequency converter, they will not be described in detail. However, when the switch is placed in position 4 by rotating shaft 67 60° in a counterclockwise direction, none of the transmission lines are connected to the input of the frequency converter 18 and all of the lines are terminated with their respective terminating impedances. At this time, the switch arms 119 and 120 of switch portion 74 serve to connect the antenna contacts 153 and 154 to the contacts 157, 158 which lead to the input of the television receiver, thereby permitting the subscriber to view a non-subscription program. When the selector is placed in position 1, the "off" position, none of the transmission lines 10—13 are connected to input line 19, but all are connected to ground through their respective terminating impedances. Additionally, the antenna 47 is connected to the input of the television receiver by switch arms 119 and 120. Finally, in this position, the power switch 81 is opened by the action of device 83 to disconnect the power to the receiver.

From the foregoing description of the operation of the line selector switch of the invention, it is believed apparent that movable switch portions 69 and 70 perform the function of connecting the selected transmission line to the input of the frequency converter 18, while the movable switch portions 71 and 72 perform the function of connecting the unselected transmission lines to ground through their terminating impedances. As explained previously, movable switch portion 73 serves as a ground shield between the movable switch portions 69—72 which handle the transmission lines and the movable switch portion 74 which connects the external antenna 47 to the television receiver. By utilizing active switch arms 111 and 112 which are no longer than the actual throw of the switch, namely 60° the unused active contacts in any switch portion never have a current-carrying arm directly in front of them. Instead, the grounded shield switch arms 110 and 113 are positioned in front of the unused active contacts to shield them from the current-carrying active switch arms. Additionally, each of the active contacts is separated from the remaining active contacts by at least one grounded shield contact, so that the active current-carrying paths through the switch are shielded for all switch positions. It is therefore believed apparent that the portions 69 and 70 of the line selector switch offer a shield protection comparable to that obtained with the more expensive coaxial type switches. It may also be noted that the switch arms 119 and 120 of the antenna coupling portion 74 of the switch are connected to grounded shield contacts 160 or 162 when they are not actually connecting the input of the television receiver to the external antenna, so that they function as ground shields to reduce coupling of the antenna signals to the receiver when the closed circuit program signals are being received.

Figure 7:
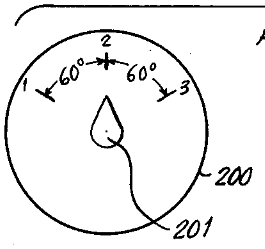
FIG. 7 is a front view of the indicator dial of a line selector switch constructed in accordance with the teachings of the invention which may be employed in a distribution system having only two transmission lines.
Figure 8:
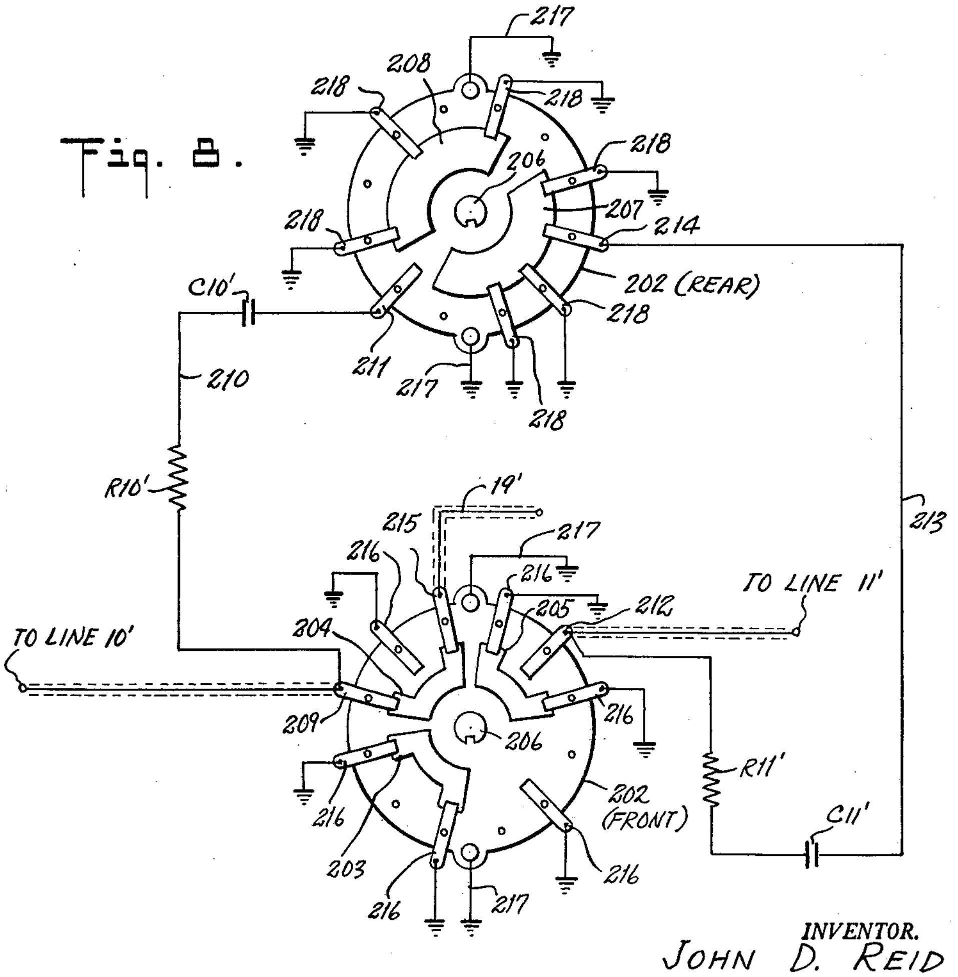
FIG. 8 is a circuit diagram of the line selector switch of FIG. 7.

FIGS. 7 and 8 of the drawings illustrate a line selector switch constructed in accordance with the teachings of the invention. This switch is similar to the switch of FIGS. 2–6 except that it is a three-position switch and is intended to handle only two transmission lines. As seen in FIG. 7, the indicator dial 200 of the switch has an indicator knob 201 mounted thereon and is calibrated in three switch positions which are angularly spaced 60° apart. The first position of the switch is the "off" position, while the second position connects a transmission line 10′ to the input of the frequency converter. The third position connects a transmission line 11′ to the input of the freqency converter. While there is no provision made in this switch for the connection of an external antenna to the television receiver, it will be under stood that an additional section comprising, for example, the portions 73 and 74 of FIG. 6, could be added if desired. Furthermore, the power switch 81 of FIG. 2 could be added if desired. Since the physical construction of the three-position selector switch may take the same form as the six-position switch of FIG. 2, except that the number of switch sections is reduced, it will not be described further.

The detailed circuit diagram for the three-position switch is shown in FIG. 8 of the drawings. As seen therein, the switch is provided with a single section 202 having front and rear portions. The front of section 202 is provided with a first shield switch arm 203, an active switch arm 204 and a second shield switch arm 205. As in the embodiment of FIGS. 2–6, a shaft 206 is arranged to rotate the switch arms when the indicator knob 201 is rotated. It may be noted that each of the switch arms 203, 204 and 205 extend over an arc of 60° which is equal to the throw of the switch. The rear portion of section 202 is provided with a switch arm 207 and a switch arm 208 as illustrated. The transmission line 10′ is directly connected to a fixed contact 209 on the front side of section 202, while the terminating impedance R10′, C10′ for the line is connected by a lead 210 to a fixed contact 211 on the rear side of section 202. In a similar manner, the transmission line 11′ is connected to a fixed contact 212 on the front side of section 202 and through its terminating impedance R11′, C11′ by a lead 213 to a fixed contact 214 on the rear side of section 202. A lead 19′ which may be the input line to the frequency connector at the subscriber location is connected to a fixed contact 215 on the front side of the section 202. As in the embodiment of FIGS. 2–6 of the drawings, a plurality of grounded shield contacts 216 are interspersed with the active contacts on the front side of section 202. Similarly, a plurality of shield contacts 218 are interspersed with the active contacts on the rear side of section 202. It may be noted that the spacer tubes which serve to separate the switch section from the end plates may be grounded as shown at 217 to provide additional shielding protection.

FIG. 8 of the drawings shows the line selector switch in its second position, so that transmission line 10′ is connected to the input line 19′ of the frequency converter, the active switch arm 204 making the actual physical connection. With the switch in this position, the shield switch arms 203 and 205, which are located adjacent the ends of the active arm, are connected to ground and function to shield the unused active contact 212 from the active switch arm 204. On the rear side of section 202, the fixed contact 211 which is connected to the terminating impedance for line 10′ is not contacted by either of the switch arms 207 and 208, so that the impedance is not connected to ground. However, the terminating impedance R11′, C11′ for the unselected line 11′ is connected to ground through lead 213, contact 214, switch arm 207 and the grounded contacts 218. Therefore, the unselected line is terminated with its characteristic impedance. In position 3 of the selector switch, the shaft 206 is rotated 60° in a clockwise direction, so that active switch arm 204 then connects contact 215 to contact 212, to thereby connect the lead 19′ to the transmission line 11′. At this time, neither of the switch arms 207 or 208 is in contact with the fixed contact 214 connected to the terminating impedance for line 11′. However, contact 212, which is connected to the terminating impedance for line 10′, is contacted by switch arm 207, and is thereby connected to ground through the shield contacts 218. When the shaft 206 is rotated 60° in a counterclockwise direction to place the switch in its first position, the terminating impedance for line 10′ is grounded through switch arm 208 and the terminating impedance for line 11′ is grounded through switch arm 207.

Furthermore, the switch arms 203, 204 and 205 are rotated so that the transmission lines 10', and 11' are not connected to the input lead 19' of the frequency converter. At this time, the contact 215 connected to the input lead 19' is shielded by the shield switch arm 205.

It is believed apparent from the foregoing description that many changes could be made in the described construction and many seemingly different embodiments of the invention could be made without departing from the scope thereof. For example, the switch device of the invention could assume physical forms other than those illustrated herein, while still retaining the basic features, such as shield contacts and shield switch arms, which provide the shielding protection. Accordingly, it is intended that all matter contained in the above description or shown in the accompanying drawings shall be interpreted as illustrative and not in a limiting sense.

What is claimed is:

1. A line selector switch for a closed-circuit distribution system for television signals and the like of the type having a plurality of signal-carrying transmission lines, an input line and a plurality of terminating impedances associated with the transmission lines, said switch having a plurality of predetermined switch positions for selectively connecting the input line to one transmission line and for connecting the unused transmission lines to the terminating impedances associated therewith, said switch comprising a group of fixed active contacts adapted to be connected to said lines, said contacts being circularly arranged so that said switch positions are spaced a predetermined angular distance apart; a group of fixed shield contacts connected to electrical ground, said shield contacts being circularly arranged and being interspersed with said active contacts, so that said active contacts are separated from each other by at least one shield contact; rotatable active switch arm means for simultaneously connecting predetermined ones of said transmission line and input line active contacts in each of said switch positions, said switch arm means being arcuate in shape and extending over said predetermined angular distance; shield switch arm means arranged for rotation with said active switch arm means and extending angularly adjacent both ends of said active switch arm means, said shield switch arm means being arcuate in shape and being in contact with at least one of said shield contacts in each of said switch positions; drive means for rotating said switch arm means to place said switch in said predetermined switch positions; and means actuated by said drive means adapted to connect each of the unused transmission lines in each switch position to the terminating impedance associated therewith, said last-named means including a second group of fixed active contacts adapted to be connected to said terminating impedances and a second group of fixed shield contacts connected to electrical ground and interspersed with the active contacts of said second group.

2. A line selector switch for a closed-circuit distribution system for television signals and the like of the type having a plurality of signal-carrying transmission lines, an input line and a plurality of terminating impedances associated with the transmission lines, each of the terminating impedances having one end thereof connected to the end of the transmission line associated therewith, said switch having a plurality of predetermined switch positions for selectively connecting the input line to one of the transmission lines and for connecting the unused transmission lines in circuit with the terminating impedances associated therewith, said switch comprising a group of fixed active contacts adapted to be connected to the ends of said lines, said contacts being circularly arranged so that said switch positions are spaced a predetermined angular distance apart; a group of fixed shield contacts connected to electrical ground, said shield contacts being circularly arranged and being interspersed with said active contacts, so that said active contacts are separated from each other by at least one shield contact; rotatable active switch arm means for simultaneously connecting predetermined ones of said active contacts in each of said switch positions, said switch arm means being arcuate in shape and extending over said predetermined angular distance; shield switch arm means arranged for rotation with said active switch arm means and extending angularly adjacent both ends of said active switch arm means, said shield switch arm means being arcuate in shape and being in contact with at least one of said shield contacts in each of said switch positions; drive means for rotating said switch arm means to place said switch in said predetermined switch positions; a second group of circularly arranged fixed active contacts adapted to be connected to the other ends of the terminating impedances; a second group of circularly arranged fixed shield contacts connected to electrical ground and interspersed with the active contacts of said second group, so that the active contacts of the second group are separated from each other by at least one shield contact; and further switch arm means arranged for rotation by said drive means, said further switch arm means being arcuate in shape and defining at least one open portion which does not contact the active and shield contacts of said second groups, whereby all of the said other ends of the terminating impedances are adapted to be connected to ground through said further switch arm means except the other end of the terminating impedance associated with the active contact of said second group adjacent said open portion.

References Cited in the file of this patent

UNITED STATES PATENTS

| | | |
|---|---|---|
| 322,693 | Delany et al. | July 21, 1885 |
| 713,712 | Stuart | Nov. 18, 1902 |
| 1,343,109 | Byerly | June 8, 1920 |
| 1,717,285 | Vickery | June 11, 1929 |
| 1,832,869 | Macy | Nov. 24, 1931 |
| 1,852,753 | Knoop | Apr. 5, 1932 |
| 2,008,293 | Norviel | July 16, 1935 |
| 2,059,780 | Edwards et al. | Nov. 3, 1936 |
| 2,222,085 | Mohler | Nov. 19, 1940 |
| 2,543,804 | Proctor | Mar. 6, 1951 |
| 2,551,943 | Gulow | May 8, 1954 |
| 2,760,127 | Duncan et al. | Aug. 21, 1956 |
| 2,833,862 | Tolson | May 6, 1958 |

FOREIGN PATENTS

| | | |
|---|---|---|
| 470,505 | Canada | Jan. 2, 1951 |
| 758,518 | Germany | Feb. 8, 1954 |
| 784,778 | Great Britain | Oct. 16, 1957 |